United States Patent [19]
Yamamoto et al.

[11] Patent Number: 5,436,661
[45] Date of Patent: Jul. 25, 1995

[54] SOLID STATE IMAGE PICK-UP APPARATUS AND METHOD FOR INCREASED LUMINANCE SIGNAL RESOLUTION

[75] Inventors: Kazumi Yamamoto; Kenichi Sueyoshi; Masayuki Sugasawa, all of Tokyo, Japan

[73] Assignee: Ikegami Tsushinki Co., Ltd., Tokyo, Japan

[21] Appl. No.: 90,940

[22] Filed: Jul. 14, 1993

[51] Int. Cl.$^6$ .............................. H04N 9/09
[52] U.S. Cl. .................... 348/264; 348/263; 348/265
[58] Field of Search ................ 358/41, 50, 52; H04N 9/09; 348/262–265

[56] References Cited

U.S. PATENT DOCUMENTS

| | | | |
|---|---|---|---|
| 4,334,238 | 6/1982 | Morishima et al. | 348/265 |
| 4,507,679 | 3/1985 | Bendell | 358/55 |
| 5,184,212 | 2/1993 | Yamamoto et al. | 348/265 |

FOREIGN PATENT DOCUMENTS

| | | | |
|---|---|---|---|
| 3345637 | 12/1983 | Germany | H04N 9/04 |
| 60-154781 | 8/1985 | Japan | H04N 5/225 |
| 61-294988 | 12/1986 | Japan | H04N 9/09 |
| 1140886 | 6/1989 | Japan | H04N 9/09 |

OTHER PUBLICATIONS

Patent Abstracts of Japan, vol. 12, No. 228 (E-627) 28 Jun. 1988 and JP-A-63 020 990 (Matsushita Electric Ind. Co. Ltd.) 28 Jan. 1988.
Patent Abstracts of Japan, vol. 15, No. 351 (E-1108) 5 Sep. 1991 and JP-A-03 135 285 (Matsushita Electric Ind. Co. Ltd.) 10 Jun. 1991.

*Primary Examiner*—James J. Groody
*Assistant Examiner*—Cheryl Cohen
*Attorney, Agent, or Firm*—Spencer, Frank & Schneider

[57] ABSTRACT

A solid state image pick-up apparatus including an objective lens for forming an image of an object, and a color separation optical system for dividing said image of the object into four color images, e.g. first and second green images, a red image and a blue image, one of said four color images being right and left reversed, first to fourth solid state image sensors for receiving said four color images respectively to derive first and second green color signals, a red color signal and a blue color signal. Light receiving elements of said first solid state image sensor are shifted with respect to those of the second solid state image sensor by a half of a pitch at which these light receiving elements are arranged in a horizontal scanning direction to perform a so-called offset-site pick-up. The first and second green image signals are mixed with each other at an ideal ratio of 1:1 to derive a green color signal. An image signal derived from one of said four solid state image sensors which receives said right and left reversed image is processed by a reverse circuit. Said green color signal, red color signal and blue color signal are supplied to a luminance matrix and are mixed therein to produce a luminance signal having a high resolution.

12 Claims, 7 Drawing Sheets

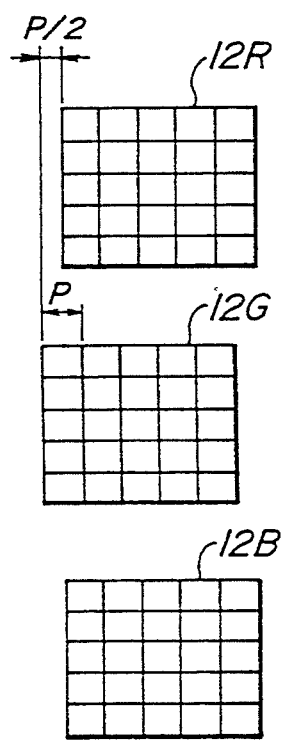
FIG_2A
PRIOR ART
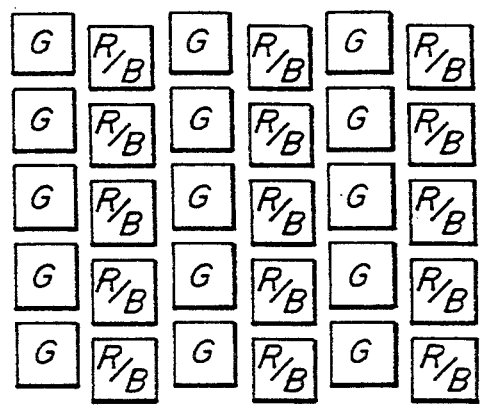
FIG_2B
PRIOR ART

FIG_4A
PRIOR ART
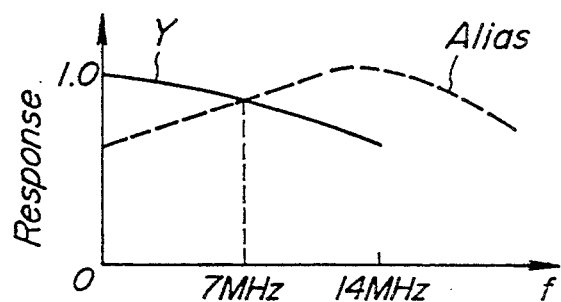
FIG_4B
PRIOR ART
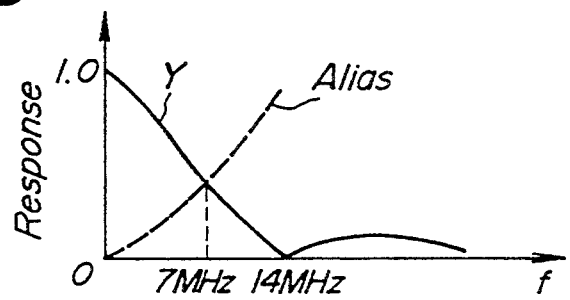

FIG._6

SOLID STATE IMAGE PICK-UP APPARATUS AND METHOD FOR INCREASED LUMINANCE SIGNAL RESOLUTION

BACKGROUND OF THE INVENTION

1. Field of the Invention

The present invention relates to a solid state image pick-up apparatus, and more particularly to a color solid state image pick-up apparatus comprising a color separation optical system for dividing an image of an object to be picked-up into red, green and blue color images and a plurality of solid state image sensors for receiving these color images.

2. Description of the Related Art

In the solid state image pick-up apparatus, a charge coupled device (CCD) has been generally used as a solid state image sensor. CCD cameras have been widely used, not only in video cameras for domestic use, but also in television cameras for broadcasting use. In order to improve the resolution of the CCD camera, a lot of work has been done for increasing the number of light receiving elements in the CCD. However, this approach is limited by to a limitation in miniaturization. Further, when the number of light receiving elements is increased the aperture of each element is reduced, so that S/N, sensitivity and dynamic range are liable to be decreased. Therefore, each aperture of the light receiving element could be reduced only to a limited extent.

In order to mitigate the above mentioned drawback, a so-called offset-site pick-up method has been proposed. FIG. 1 illustrates a known color television camera using the offset-site pick-up method. An image of an object to be picked-up is formed by an objective lens 10 and the thus formed image is separated by a color separation optical system 11 into red, green and blue color images. These color images are picked-up by means of respective solid state image sensors, i.e., CCDs 12R, 12G and 12B. As shown in FIG. 2A, light receiving elements of the CCDs 12R and 12B receiving the red and blue color images, respectively, are shifted with respect to light receiving elements of the CCD 12G viewed in a main scanning direction, i.e., in a horizontal scanning direction substantially by a half of a pitch P at which the light receiving elements of these CCDs are arranged regularly in the horizontal scanning direction.

Color image signals read out of CCD 12R, 12G and 12B, respectively, are supplied to correlated double sampling circuits 13R, 13G and 13B, respectively, to derive red, green and blue image signals. In order to make the phases of these color image signals identical with each other, the green image signal is supplied to a delay circuit 14 having a delay time $\tau$ which corresponds to a time interval during which a distance of a half pixel pitch is scanned. The red, green and blue image signals having the identical phases are supplied to low pass filters 15R, 15G and 15B, respectively, to remove high frequency sampling noise, and then are supplied to image processing circuits 16R, 16G and 16B, respectively. The red, green and blue image signals are further supplied to variable delay circuits 17R, 17G and 17B, respectively, to compensate remaining small phase differences.

The thus obtained color image signals are supplied to a matrix circuit 18 and are combined therein at a given ratio to derive a luminance signal Y. In NTSC standard, the red, green and blue image signals are mixed at a ratio of 0.30:0.59:0.11. Then, the thus obtained luminance signal Y is amplified by an amplifier 19. In this manner, in the color television camera using the offset-site pick-up method, the color image signals are spatially sampled such that the red and blue pixels R and B are arranged between adjacent green pixels G as depicted in FIG. 2B, so that the resolution of the luminance signal Y obtained by mixing these image signals is apparently increased twice and a folding alias component which might deteriorate the quality of a reproduced image is reduced.

In the known color television camera using the offset-site pick-up, as far as a single color channel is concerned, the number of pixels of a CCD is not increased at all, and thus the resolution is not increased and the folding alias component or pseudo signal is not decreased. This is due to the fact that a spatial low pass filter, i.e., optical low pass filter arranged between the objective lens 10 and CCDs is designed such that the maximum effect could be attained for the luminance signal Y obtained by the offset-site pick-up. This will be explained further.

In CCD having 400,000 pixels, the sampling frequency is about 14 MHz. When this CCD is used in the offset-site pick-up camera, the sampling frequency is increased twice and becomes about 28 MHz. Therefore, if a low pass filter having a cut-off frequency which is a half of the sampling frequency is provided before or after the sampling circuit, there is not produced the pseudo signal owing to the Nyquist theory. Therefore, in the known color television camera comprising three CCDs, the spatial low pass filter is designed to cut off a spatial frequency component higher than about 14 MHz, so that the pseudo signal is suppressed in the luminance signal. This will be explained further in detail with reference to FIG. 3.

As explained above, in the offset-site pick-up camera, the sampling frequency is apparently increased twice as compared with a single CCD camera. In a CCD having 400,000 pixels, the response is increased up to twice the sampling frequency, i.e., about 28 MHz. FIG. 3A illustrates the response of the luminance signal Y and alias component when the spatial low pass filter is not provided. In this case, the folding alias component appears largely in the lower frequency region. FIG. 3B shows the response of the spatial low pass filter having the cut-off frequency of 14 MHz, and FIG. 3C depicts the response of the luminance signal Y and pseudo signal when the signal having the response shown in FIG. 3A is passed through said spatial low pass filter. When the spatial low pass filter is used, the pseudo signal is reduced to a large extent. However, for respective channels, the sampling frequency is the same as the single CCD camera, i.e., 14 MHz, and thus the frequency response of the color signal and alias component is represented in FIG. 4A. It is assumed that the solid state image sensor has the aperture ratio of 50%. Therefore, when the spatial low pass filter having the cut-off frequency of 14 MHz is inserted, the frequency response becomes as shown in FIG. 4B. That is to say, the alias component is hardly reduced. In this case, in order to reduce the alias component in respective color channels, it is necessary to provide a spatial low pass filter having a cut-off frequency of 7 MHz. This 7 MHz corresponds to 560 TL (television line), so that the resolution is reduced lower than 560 TL.

In the NTSC standard, the luminance signal Y is derived by mixing the red, green and blue color signals at the ratio of 0.30:0.59:0.11, and therefore when the offset-site pick-up is adopted between the green channel and the red and blue channels, the mixing ratio of the color signals becomes 0.59:(0.30+0.11)=0.59:0.41. In this manner, the mixing ratio deviates from 1:1. Then, the offset-site pick-up becomes out of order by an amount which corresponds to a deviation of the mixing ratio from the ideal mixing ratio of 1:1. That is to say, the effectiveness of the offset-site pick-up is reduced by about 20%.

Further, as shown in FIG. 1, there are provided the low pass filters 15R, 15G, 15B and image signal processing circuits 16R, 16G, 16B between the CCDs 12R, 12G, 12B and the luminance matrix 18, so that the color image signals are liable to be affected by the deterioration in the frequency characteristic and the deviation in time delay between the color image signals which affect the effectiveness of the offset-site pick-up. For instance, in case of using the CCD of 400,000 pixels, the resolution is limited to about 700 TL. Particularly, when the distance between the CCD and the signal processing circuit is long, deterioration in the frequency characteristic and deviation in time delay are introduced, and thus the effectiveness of the offset-site pick-up might be further lost. In this manner, in the known television camera using the offset-site pick-up, it is necessary to strictly manage the time of the color image signals between the CCDs and the luminance matrix, and if there is a time deviation of 10 ns between the color image signals derived from the CCD of 400,000 pixels, the effectiveness of the offset-site pick-up is no longer attained. Therefore, the deviation in time has to be suppressed below this value, but this could be realized only with difficulty.

Furthermore, the objective lens has chromatic aberration and distortion, so that there is a so-called registration error produced between the red, green and blue color image signals, which also affects the effectiveness of the offset-site pick-up. A zoom lens is generally used as the objective lens for the television camera. Then, large aberrations are produced. That is to say, there are produced an on-axis chrominance aberration in which an imaging position is varied in accordance with a zooming ratio and a multiplication chromatic aberration in which the imaging magnification is changed for respective color images in a periphery of the image. Therefore, a very large registration error is produced and the function of the offset-site pick-up is further reduced. Such a disadvantage also occurs when the registration error is generated by a de-focused condition.

In the NTSC standard, it is recommended that the objective lens have a registration error smaller than 10 $\mu$m. However, in a newly developed high definition television, it is desired to make the registration error smaller than 5 $\mu$m. However, when a $\frac{1}{2}$ inch CCD having 1,400,000 pixels is used, since the pixel pitch P is 7.6 $\mu$m (H)$\times$5.2 $\mu$m (V), the amount of the pixel shift has to be set to 3.8 $\mu$m and thus when the objective lens has a chrominance aberration of about 5 to 10 $\mu$m, it is no longer possible to obtain the effective offset-site pick-up over the whole image, but the offset-site pick-up could be effective only in a limited condition. For instance, the offset-site pick-up is effective only in the central portion of the image or at a middle of wide and telescopic ends or for F4.0.

In order to mitigate the above mentioned drawback, there has been proposed a CCD camera using a so-called dual-green system. In this known camera, two CCDs are arranged to receive the green image and are shifted in the horizontal direction by a half of the pixel pitch and one CCD is used to receive the red and blue images which has a stripe or mosaic red and blue color filter applied thereon. In this case, as far as the green color signal is concerned, the ideal offset-site pick-up can be obtained and the above mentioned drawback can be overcome, but the resolution of the red and blue color signals is reduced by two.

In Japanese Patent Application Laid-open Publication Kokai Sho 60-154781, there is described a color television camera, in which the image of the object to be picked-up is separated into two green images, one red image and one blue image and these four images are received by four CCDs which are arranged in the offset-site pick-up mode. However, in such a known camera, the color separation optical system is liable to be complicated in construction and large in size, so that the distance between an objective lens fixing surface to the light receiving surfaces of CCDs (generally termed flange back) becomes long and might be beyond a predetermined value. In such a case, existing objective lenses could not be utilized. This is due to the fact that in the color separation optical system, it is necessary to avoid undesired right and left reverse due to the odd numbered reflections. Moreover, in the known camera, the offset-site pick-up is performed between different colors, and it is affected by the chrominance aberration of the objective lens, so that the offset-site pick-up is effective only in a very narrow area.

When the CCD having 1,300,000 pixels is used in the dual green camera, 1250 pixels are arranged in a horizontal line, so that the number of pixels in one line of each of the red and blue color signals is 625 pixels. The resolution of this CCD is 700 TL, so that for the red and blue images, the resolution amounts to only 350 TL. In the current high-vision broadcasting, sampling frequencies for digital equipments in a broadcasting studio are determined to be 74.25 MHz for the luminance signal and 37.125 MHz for the color difference signals. Therefore, for the luminance signal, an apparent sampling frequency becomes 48.6$\times$2=97.2 MHz which is higher than the sampling frequency for the digital equipments connected to the image pick-up apparatus, but for the color difference signals the apparent sampling frequency is determined by the bandwidth of the red and blue color signals and becomes 24.3 MHz which is lower than the sampling frequency of the digital equipments.

Moreover, for the red and blue channels, there is provided only one CCD having the stripe or mosaic color filter applied thereon, so that if the horizontal transporting efficiency within CCD is low, the red and blue color signals are mixed with each other and the color separation is deteriorated.

SUMMARY OF THE INVENTION

The present invention has for its object to provide a novel and useful solid state image pick-up apparatus which can mitigate the above mentioned drawbacks of the known solid state image pick-up apparatuses and the resolution can be increased by reducing the folding pseudo signal without decreasing the cut-off frequency of the spatial low pass filter and the ideal offset-site pick-up can be attained.

According to the invention, a solid state image pick-up apparatus comprises:

an objective lens for forming an image of an object to be picked-up;

a color separation optical system for separating said image of the object into red, green and blue color images and further separating one of said red, green and blue color images into two images of the same color to obtain four color images, one of said four color images being right and left reversed with respect to the remaining three color images;

a first solid state image sensor for receiving one of said two images of the same color to derive a first image signal;

a second solid state image sensor for receiving the other of said two images of the same color to derive a second image signal, and having light receiving elements which are shifted with respect to light receiving elements of said first solid state image sensor in a horizontal scanning direction by a half of a pitch at which said light receiving elements are arranged in the horizontal scanning direction;

a combining circuit for combining said first and second image signals derived from said first and second solid state image sensors, respectively to derive a first color image signal;

a third solid state image sensor for receiving one of the remaining two different color images to derive a second color image signal;

a fourth solid state image sensor for receiving the other of the remaining two different color images to derive a third color image signal;

a right and left reversing means for deriving a right and left reversed image signal from one of said four solid state image sensors which receives the right and left reversed image; and a luminance matrix for mixing said first, second and third color image signals at a predetermined ratio to derive a luminance signal.

In a preferable embodiment of the solid state image pick-up apparatus according to the invention, a green image obtained by the color separation optical system is further divided into first and second green images and these first and second green images are received by first and second solid state image sensors whose light receiving elements are spatially shifted with respect to each other in the horizontal direction by a half of the pitch at which the light receiving elements are arranged in the horizontal scanning direction. Prior to deriving the luminance signal, the first and second green signals read out of said first and second solid state image sensors are mixed to derive a green color signal. Therefore, when use is made of four CCDs each having 400,000 pixels, the sampling frequency in the green channel becomes 28 MHz which is equal to the frequency response of the luminance signal as shown in FIG. 3A, so that the pseudo signal, i.e., alias component can be reduced although the spatial low pass filter having a cut-off frequency of 14 MHz is used.

Moreover, the first and second green image signals derived from the first and second solid state image sensors can be mixed at an ideal ratio of 1:1, and thus the offset-site pick-up is always maintained and the resolution can be improved. Further, the offset-site pick-up is performed within the same color channel, and therefore the effect of the pixel shift is no more affected by the registration error due to the aberrations of the objective lens and the de-focusing condition. When the mixing is performed prior to the signal processing, the effectiveness of the offset-site pick-up is not affected by the deterioration in the frequency characteristics and the deviation in the delay time although a length of the transmission line between the image pick-up unit and the signal processing unit is long. In this manner, the resolution of the luminance signal can be improved and the dynamic range can be increased by two.

In each of the remaining color channels in which the offset-site pick-up is not effected, e.g., red and blue channels, there is provided only one solid state image sensor, and thus the resolution of the color signals read out of these solid state image sensors is not decreased. Further, the red and blue color image signals are not mixed with each other although the horizontal transferring efficiency becomes low.

Moreover, the color separation optical system of the image pick-up apparatus according to the invention could be obtained by simply adding only one dichroic plane or half mirror plane to the existing color separation prism, and thus a whole optical system can be made small in size. Therefore, the flange back of the television camera is not prolonged, and existing objective lenses can be used as they are. In the solid state image pick-up apparatus according to the invention, one image is right and left reversed with respect to the remaining three images. Therefore, it is necessary to right and left reverse the image signal read out of one solid state image sensor receiving this right and left reversed image. This may be carried out by reading the relevant solid state image sensor in a right and left reversed manner or by processing the image signal read out of the relevant solid state image sensor through an electric circuit which can right and left reverse the image signal.

BRIEF DESCRIPTION OF THE DRAWINGS

FIGS. 2A and 2B are plan views illustrating the arrangement of the light receiving elements in the offset-site pick-up camera;

FIGS. 4A and 4B are graphs showing the frequency response of the color signal and pseudo signal of the known solid state image sensing apparatus;

DESCRIPTION OF THE PREFERRED EMBODIMENTS

Figure 1:
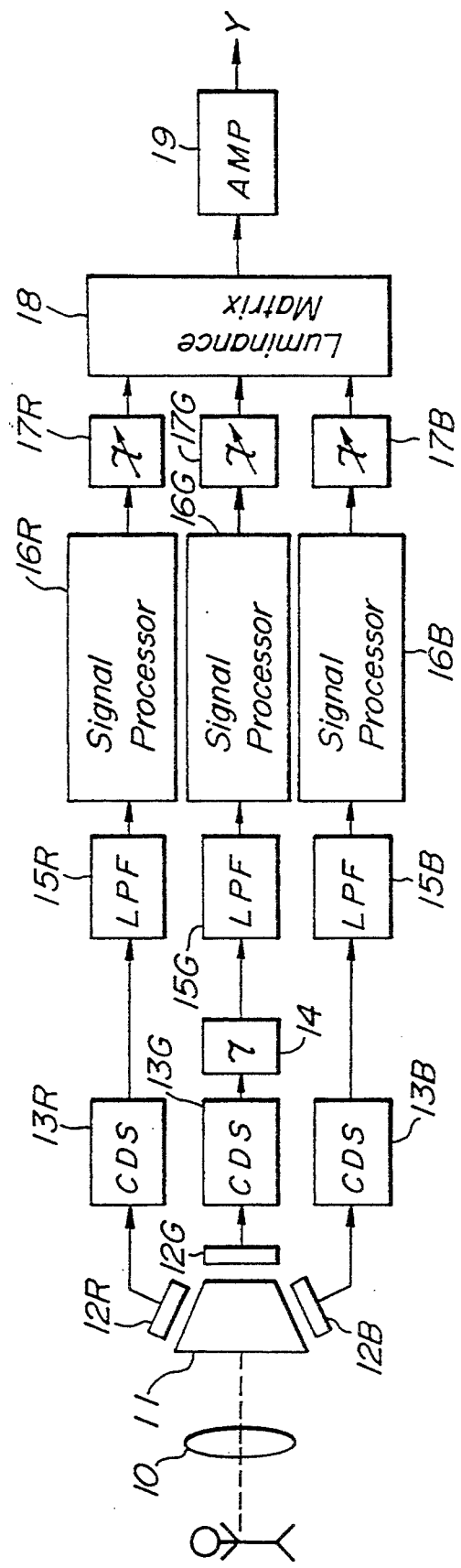
FIG. 1 is a schematic view showing a known CCD color television camera using the offset-site pick-up.
Figure 3A:
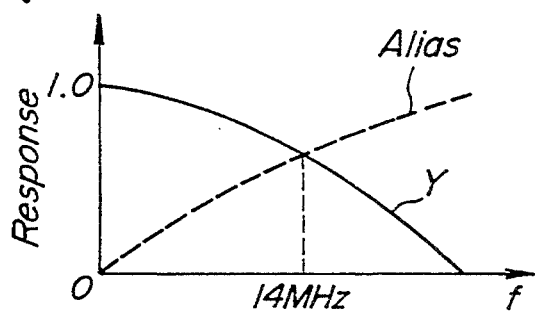
FIGS. 3A is a graph representing the frequency response of the luminance signal and pseudo signal when a spatial low pass filter is provided.
Figure 3B:
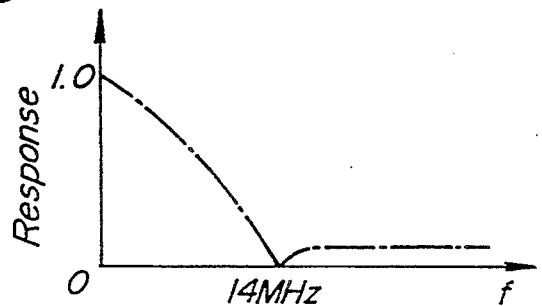
FIG. 3B is a graph showing the frequency response of the spatial low pass filter.
Figure 3C:
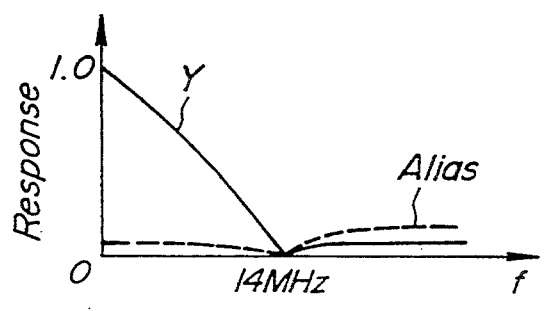
FIG. 3C is a graph depicting the frequency response of the luminance signal and pseudo signal when the spatial low pass filter is provided.
Figure 5:
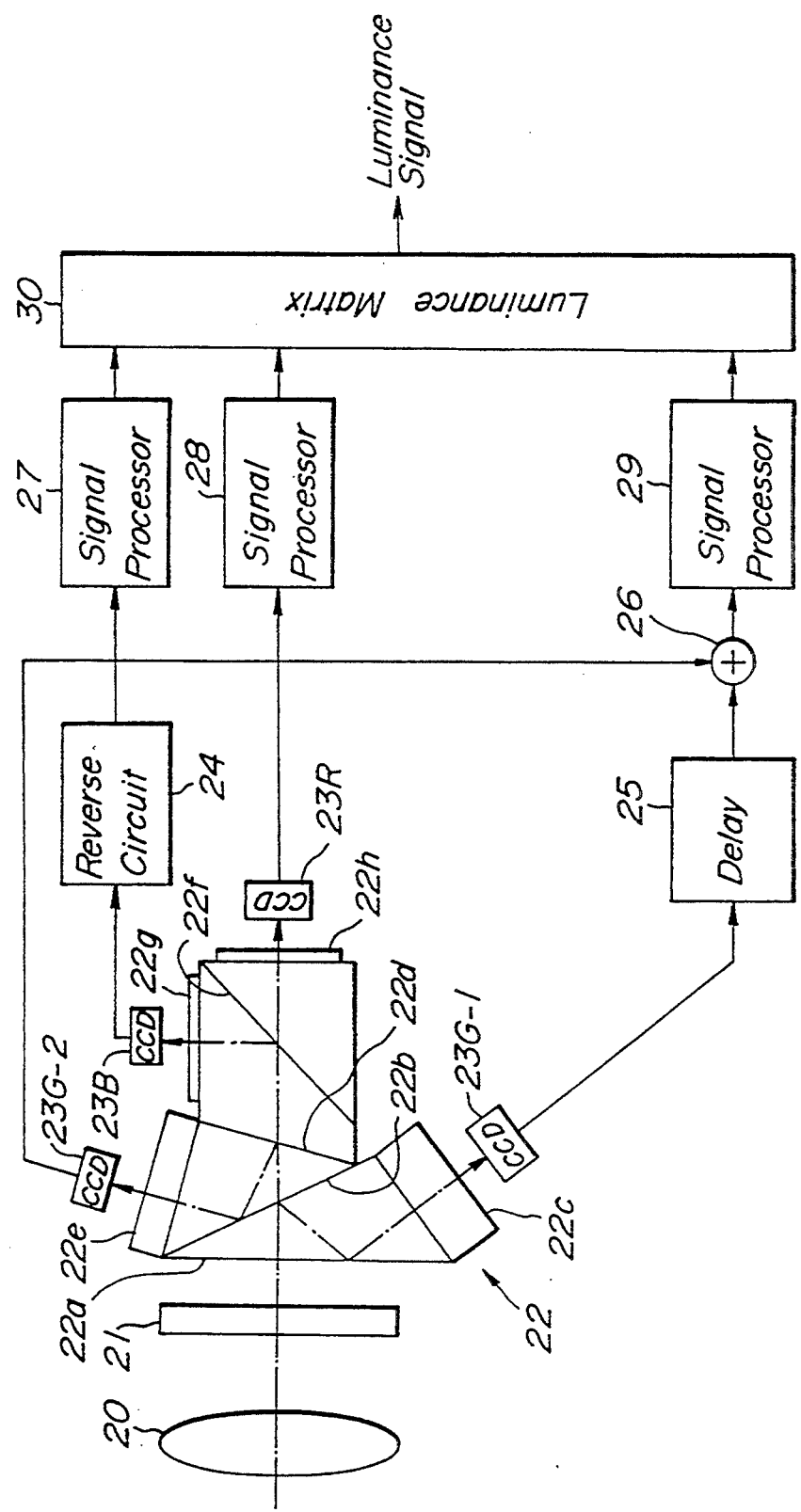
FIG. 5 is a schematic view illustrating the construction of an embodiment of the solid state image sensing apparatus according to the invention.

FIG. 5 is a schematic view showing an embodiment of the solid state image pick-up apparatus according to the invention. In the present embodiment, the color separation optical system is constructed such that an image of an object to be picked-up is first divided into red, green and blue color images and then the green color image is further divided into first and second green signals. The image of the object is formed by an objective lens 20 is made incident upon in incident plane 22a of a color separation optical system 22 via a spatial low pass filter 21. The color separation optical system 22 comprises a first dichroic plane 22b which reflects a half amount of green light and transmits a remaining half amount of the green light and red and blue light. The green light reflected by the first dichroic plane 22b is reflected by the incident plane 22a and emanates from a first exit plane 22c. The light transmitted through the first dichroic plane 22b is made incident upon a second dichroic plane 22d which reflects the green light and transmits the red and blue light. The green light reflected by the second dichroic plane 22d emanates from a second exit plane 22e. The red and blue light transmitted through the second dichroic plane 22d is made incident upon a third dichroic plane 22f which transmits the red light and reflects the blue light. The blue light reflected by the third dichroic plane 22f emanates from a third exit plane 22g. The red light transmitted through the third dichroic plane 22f emanates from a fourth exit plane 22h. In this manner, the first and second green images emanate from the first and second exit planes 22c and 22e, respectively, and the blue and red images emanate from the third and fourth exit planes 22g and 22h, respectively. These first and second green images, blue image and red image are received by first, second, third and fourth CCDs 23G-1, 23G-2, 23B and 23R, respectively. The color separation optical system 22 of the present embodiment can be easily obtained by adding to an existing color separation prism one dichroic plane, i.e. the third dichroic plane 22f, so that the flange back which is defined by a distance from a lens fixing plane to respective CCDs can be maintained within a standard value and thus the existing objective lenses can be utilized as they are. That is to say, it is not necessary to design new objective lenses.

When the above mentioned color separation optical system is utilized, the first and second green images are reflected two times and the red image is not reflected at all, but the blue image is reflected only once. Therefore, the blue image is right and left reversed with respect the green and red images. In the present embodiment, a blue image signal derived from the blue CCD 23B is supplied to a reverse circuit 24 to obtain a right and left reversed blue image signal.

The first and second green CCDs 23G-1 and 23G-2 have light receiving elements which are shifted in the horizontal scanning direction from each other by a half of a pitch at which the light receiving elements are arranged in the horizontal scanning direction. That is to say, in the present embodiment, only in the green channel, the offset-site pick-up is performed. A first green image signal read out of the first green CCD 23G-1 is supplied to a delay circuit 25 having a delay time which corresponds to a time period during which a half of the pitch is scanned, i.e., a half of a period of a horizontal reading out clock. Then, the thus delayed first green image signal and the non-delayed second green image signal are mixed in an adder 26 at a ratio of 1:1 to derive a green image signal. According to the present invention, since the two image signals which are read out of two CCDs adopting the offset-site pick-up are mixed at the ratio of 1:1, it is possible to perform the ideal offset-site pick-up. Moreover, in the present embodiment, the mixing of the first and second green image signals is carried out prior to the introduction of undesired factors such as the deterioration in the frequency characteristics and the fluctuation in the delay time which affect the effectiveness of the offset-site pick-up, and therefore, it is possible to attain the high resolution. Moreover, the offset-site pick-up is performed in the same color channel, and thus it is not affected by the chromatic aberration of the objective lens 20.

The blue image signal derived from the reverse circuit 24, the red image signal read out of the fourth CCD 23R and the green image signal derived from the adder 26 are supplied to respective signal processing circuits 27, 28 and 29 to effect various processings such as correlated double sampling, gamma correction, gain control and knee processing. Then, the blue, red and green image signals are supplied to a luminance matrix 30 are combined therein at a given ratio to derive a luminance signal.

In the present embodiment, in the green channel there are provided two CCDs 23G-1 and 23G-2 to perform the offset-site pick-up, so that the sampling frequency of 28 MHz can be used and the pseudo signal can be highly suppressed together with the spatial low pass filter 21 having the cut-off frequency of 14 MHz. In this manner, the resolution of the luminance signal can be increased. Moreover, the first and second green image signals are mixed with each other at the ideal ratio of 1:1 prior to the signal processing which might induce the deterioration in the frequency characteristics and the deviation in the delay time, and therefore the effectiveness of the offset-site pick-up can be attained optimally. Even if the registration error occurs between the blue, red and green images due to the aberrations of the objective lens 20, the effectiveness of the offset-site pick-up can not be affected because the pixel shift is performed in the same color channel. Furthermore, the size of the color separation optical system 22 is substantially same as the known color separation prism, and thus the flange back can be maintained within the standard value and the existing objective lenses can be utilized.

Figure 6:
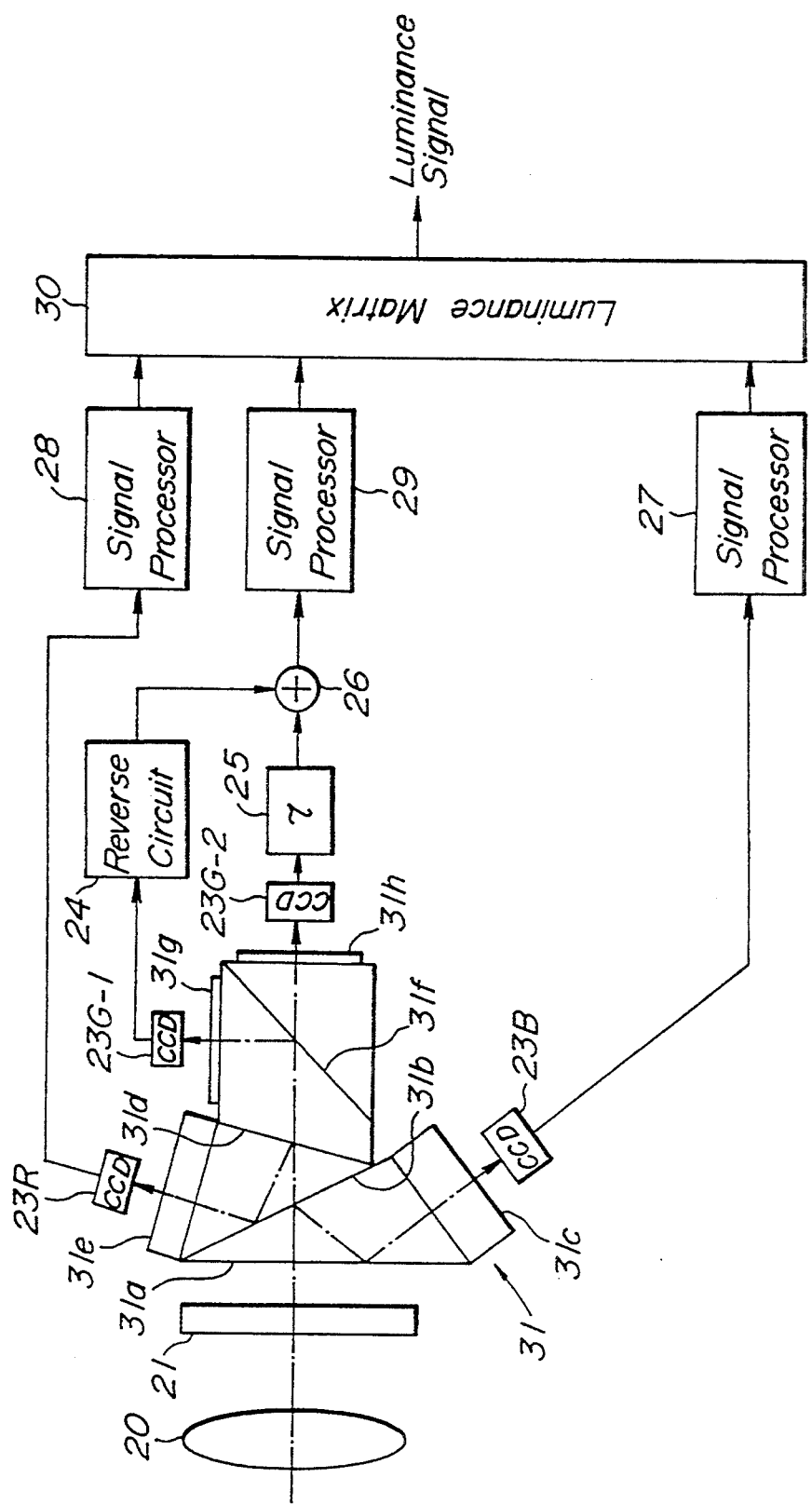
FIG. 6 is a schematic view denoting the construction of another embodiment of the solid state image sensing apparatus according to the invention.

FIG. 6 is a schematic view showing another embodiment of the solid state image pick-up apparatus according to the invention. In the present embodiment, the construction of the color separation optical system producing the two green images is slightly different from that of the previous embodiment shown in FIG. 5 and the offset-site pick-up is carried out for the two green images. That is to say, a first dichroic plane 31b of the color separation optical system is constructed to reflect only the blue light and transmits the red and green light. The blue light reflected by the first dichroic plane 31b is reflected by the incident plane 31a and is made incident upon a first exit plane 31c. The red and green light transmitted through the first dichroic plane 31b is made incident upon a second dichroic plane 31d which reflects the red light and transmits the green light. The red light reflected by the second dichroic plane 31d emanates from a second exit plane 31e. The green light transmitted through the second dichroic plane 31d is made incident upon a half mirror plane 31f and a half amount of the green light is reflected thereby and emanates from a third exit plane 31g and a half amount of the green light is transmitted through the half mirror plane and emanates from a fourth exit plane 31h.

The single red image, single blue image and two green images are received by CCDs 23R, 23B, 23G-1 and 23G-2, respectively, to derive the red image signal, blue image signal, and first and second green image signals. The CCDs 23G-1 and 23G-2 for receiving the first and second green images are arranged such that the offset-site pick-up is performed between them. That is to say, light receiving elements of the CCD 23G-2 are shifted with respect to light receiving elements of the remaining CCDs 23R, 23B and 23G-1 by a half of the pitch in the horizontal scanning direction. It should be noted that the first green image received by CCD 23G-1 is right and left reversed with respect to the remaining images, so that the first green image signal read out of CCD 23G-1 is reversed by a reverse circuit 24. Similar to the first embodiment, the right and left reversed first green image signal and the second green image signal delayed by a delay circuit 25 having a delay time corresponding to a time period during which a half of the pitch is scanned in the horizontal direction are then supplied to an adder 26 and are mixed therein at a ratio of 1:1 to derive a green image signal whose resolution has been apparently improved by the offset-site pick-up. Then, the blue image signal read out of CCD 23B, the red image signal read out of CCD 23R and the green image signal derived from the adder 26 are supplied to respective signal processing circuits 27, 28 and 29, and then the processed red, blue and green image signals are supplied to a luminance matrix 30.

Figure 7:
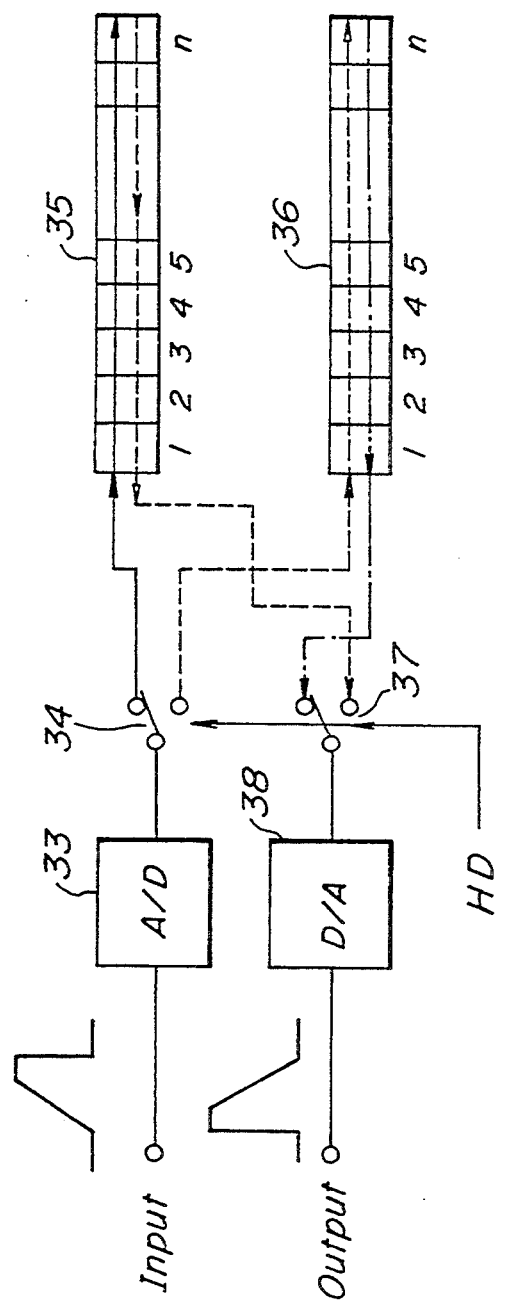
FIG. 7 is a block diagram showing an embodiment of the right and left reversing circuit for use in the solid state image sensing apparatus according to the invention.

FIG. 7 is a block diagram showing a detailed construction of an embodiment of the above-mentioned right and left reverse circuit 24. The right and left reversed input image signal is first supplied to an A/D converter 33 and is converted thereby into a digital image signal. Then, the digital image signal is supplied via a first switch 34 to first line memory 35 or second line memory 36. In these line memories 35 and 36, the digital image signal is stored together with addresses. Then, the digital image signal stored in these line memories 35 and 36 are read out in a reversed order with the aid of the addresses. The thus read out digital image signal is supplied via a second switch 37 which is driven in synchronism with the first switch 34 to a D/A converter 38 and is converted into an analog image signal which is derived as an output image signal. The first and second switches 34 and 37 are driven by the horizontal deriving pulse and are changed at a rhythm of the horizontal scanning period. For instance, when the image signal is stored in the first line memory 35, the image signal is read out of the second line memory 36. In FIG. 7, a solid line represents the flow of the image signal during a first line period, a broken line denotes that during a second line period, and a chain line shows that during a third line period. It should be noted that during the third line period, the image signal is supplied to the first line memory 35, but this is not shown in FIG. 7 for the sake of simplicity. In this manner, the right and left reversed image signal read out of CCD 23G-1 can be reversed. When the above explained reverse circuit is used, the image signal derived from the reverse circuit is delayed by one line period with respect to the remaining image signals, but this may be compensated for by arranging the CCD 23G-1 such that this CCD is shifted upwardly in the vertical direction by one line pitch with respect to the remaining CCDs.

In order to avoid the deterioration in the resolution of the right and left reversed image signal due to the conversion at the A/D converter and D/A converter, it is sufficient for effect the conversion by means of clock pulses having a frequency higher than the CCD driving clock frequency. Then, the sampling clock might interfere with the CCD driving clock. Therefore, in order to avoid such an interference, the A/D conversion and D/A conversion are preferably carried out by the sampling clock having the frequency equal to the CCD driving clock frequency. When use is made of CCD having 1,300,000 pixels, one clock period corresponds to 20 ns and thus the offset-site pick-up is performed at a period of 10 ns, and therefore the time management of the image signal derived from the D/A converter has to be strictly effected.

As explained above, it is preferable to arrange the reverse circuit prior to the signal processing, but according to the invention the reverse circuit may be provided within the signal processing circuit.

The present invention is not limited to the embodiments explained above, but many alterations and modifications may be conceived by those skilled in the art within the scope of the invention. For instance, in the above embodiments, the image signal read out of CCD which receives the right and left reversed image is reversed by the reverse circuit, but according to the invention, use may be made of a special CCD which can derive a right and left reversed image signal. For instance, ICX046A manufactured by Sony corporation may be advantageously utilized for this purpose. In this CCD, it is possible to derive a normal image signal and a right and a mirror image signal (right and left reversed image signal) by changing a manner of the horizontal transfer. Further, in the above embodiments, the offset-site pickup is performed for the green image, but according to the invention the offset-site pick-up may be carried out for red or blue channel. Moreover, in the embodiments shown in FIGS. 5 and 6, the offset-site pick-up method may be applied to the red and blue channels, in addition to the green channel. For instance, the light receiving elements of CCD 23R may be shifted with respect to the light receiving elements of the CCD 23B by a half of the pitch in the horizontal scanning direction. Then, the first green signal read out of the first CCD 23G-1 and the red image signal read out of the third CCD 23R have the same phase and the second green signal read out of the second green CCD 23G-2 and the blue image signal read out of the fourth CCD 23B have the same phase, which is shifted with respect to that of the first green signal and red signal by a half of the pitch in the horizontal scanning direction.

In the solid state image pick-up apparatus according to the invention, the pixel shift is performed within the same color channel, and therefore the folding pseudo signal can be suppressed without lowering the cut-off frequency of the spatial low pass filter, so that the resolution can be improved to a large extent. Further, the two images of the same color are mixed at the ideal ratio of 1:1, and thus the offset-site pick-up can be carried out very effectively. Moreover, the offset-site pick-up is performed prior to the signal processing which might introduce the deterioration in the frequency characteristics and the deviation in the delay time, the effectiveness of the offset-site pick-up is not affected and the management of time can be less strict. Further, even if the registration error occurs due to the aberrations of the objective lens and de-focusing condition, this could not affect the offset-site pick-up. As compared with the known dual-green camera, amounts of light impinging upon the solid state image sensors is increased, and therefore the effect of the improved dynamic range can be attained.

Further, color images which are not subjected to the offset-site pick-up are received by respective solid state image sensors, and thus the resolution of these color image signals is not reduced. Moreover, the color separation optical system can be simply realized by adding one half mirror plane to the existing color separation prism, and therefore the color separation optical system can be small in size and the flange back can be remained within the standard value. Therefore, the existing objective lenses can be utilized as they are.

The solution according to the present invention is very useful when CCD having more than two million pixels in the feature. A sampling frequency for ⅔ inch CCD with two million pixels is predicted to be 74.5 MHz which is equal to that of the high definition TV studio standard. When the sampling frequency for CCD becomes equal to the digital sampling frequency in the high definition TV, it may be assumed that it would be not necessary to increase the number of pixels any more. However, in practice it is effective to adopt the offset-site pick-up upon considering the response characteristics and pseudo signal. When the analog signal is sampled, the pseudo signal appears as long as a signal component higher than the Nyquist frequency which is equal to a half of the sampling frequency. For this purpose, the quartz low pass filter is provided for CCD and an electrical filter is used for the digital processing in the high definition TV. The ideal electric filter could be realized, but the quartz low pass filter has a very low response in a vicinity of the Nyquist frequency and it is quite difficult to obtain an ideal quartz low pass filter, so that the pseudo signal is liable to be remained. Contrary to this, when the offset-site pick-up is adopted, it is possible to remove the pseudo signal while the decrease in the response characteristics can be suppressed.

What is claimed is:

1. A solid state image pick-up apparatus comprising:
    an objective lens for forming an image of an object to be picked-up;
    a color separation optical system for separating said image of the object into red, green and blue color images and further separating said green color image into first and second green color images to obtain four color images, one of said blue and red color images being right and left reversed with respect to the remaining three color images;
    a first solid state image sensor for receiving said first green color image to derive a first image signal, the first solid state image sensor having light receiving elements arranged in a horizontal scanning direction;
    a second solid state image sensor for receiving said second green color image to derive a second image signal, the second solid state image sensor having light receiving elements arranged in the horizontal scanning direction, said light receiving elements of said second solid state image sensor being shifted with respect to light receiving elements of said first solid state image sensor in the horizontal scanning direction by one-half of a pitch;
    a combining circuit for combining said first and second image signals derived from said first and second solid state image sensors, respectively, at a ratio of 1:1 to derive a first color image signal;
    a third solid state image sensor for receiving said red color image to derive a second color image signal;
    a fourth solid state image sensor for receiving said blue color image to derive a third color image signal;
    one of the third and fourth solid state image sensors receiving the color image which is right and left reversed;
    a right and left reversing means for deriving a right and left reversed image signal from the one of said third and forth solid state image sensors which receives the right and left reversed color image; and
    a luminance matrix for mixing said first, second and third color image signals at a predetermined ratio to derive a luminance signal.

2. An apparatus according to claim 1, wherein said right and left reversing means comprises an analog-to-digital converter for converting one of said second or third image signals read out of the third and fourth solid state image sensors into a digital image signal, first and second switches which are driven in synchronism with a horizontal driving signal, first and second line memories which store said digital image signal, and a digital-to-analog converter for converting the digital image signal read out of said first and second line memories into an analog image signal, said first and second switches being driven such that the digital image signal is stored in said first and second line memories alternatively and is read out of said first and second line memories alternatively in a direction which is opposite to a direction in which the digital image signal is stored in said first and second line memories to derive a right and left reversed digital image signal.

3. A method for producing a luminance signal comprising the steps of:
    forming an image of an object;
    separating the image into first, second and third images, each image being formed from a single color and the first image being left and right reversed from the second and third images;
    separating the third image into fourth and fifth images, the fourth and fifth images being right and left reversed from the first image;
    deriving a first image signal from the first image at a first solid state image sensor;
    right and left reversing the first image signal to derive a first color image signal;
    deriving a second color image signal from the second image at a second solid state image sensor;
    deriving a third image signal from the fourth image at a third solid state image sensor, the third solid state image sensor having light receiving elements arranged in a horizontal scanning direction;
    deriving a fourth image signal from the fifth image at a fourth solid state image sensor, the fourth solid state image sensor having light receiving elements arranged in the horizontal scanning direction which are shifted with respect to light receiving elements of the third solid state image sensor by a half of a pitch in the horizontal scanning direction;
    combining the third and fourth image signals to derive a third color image signal; and
    deriving a luminance signal by mixing the first, second and third color image signals in a predetermined ratio.

4. The method according to claim 3, wherein the fourth and fifth image signals are combined at a ratio of 1:1.

5. The method according to claim 3, where the step of right and left reversing the first image signal further comprises the steps of:

converting the first image signal into a digital image signal in synchronism with a scanning rate of an arrangement of light receiving elements of the first solid state sensor;

storing the digital signal in a first line memory in a first order, the first order corresponding to consecutive light receiving elements in a first horizontal row of the arrangement of light receiving elements;

reading out the digital signal stored in the first line memory in a second order, the second order being reversed from the first order;

storing the digital signal in a second line memory in the first order while the digital signal is being read out of the first line memory;

reading out the digital signal stored in the second line memory in the second order while the digital signal is being stored in the first line memory; and converting the digital signal to the first color image signal.

6. The method according to claim 3, wherein the third and fourth image signals are each formed by a green image.

7. A method for producing a luminance signal comprising the steps of:

forming an image of an object;

separating the image into first, second and third images, each image being formed from a single color;

separating the third image into fourth and fifth images, the fifth image being right and left reversed from the first, second and fourth images;

deriving a first color image signal from the first image at a first solid state image sensor;

deriving a second color image signal from the second image at a second solid state image sensor;

deriving a third image signal from the fourth image at a third solid state image sensor, the third solid state image sensor having light receiving elements arranged in a horizontal scanning direction;

deriving a fourth image signal from the fifth image at a fourth solid state image sensor, the fourth solid state image sensor having light receiving elements arranged in the horizontal scanning direction which are shifted with respect to light receiving elements of the third solid state image sensor by a half of a pitch in the horizontal scanning direction;

right and left reversing the fourth image signal to derive a fifth color image signal;

combining the third and fifth image signals to derive a third color image signal; and deriving a luminance signal by mixing the first, second and third color image signals in predetermined ratio.

8. The method according to claim 7, wherein the third and fifth image signals are combined at a ratio of 1:1.

9. The method according to claim 7, where the step of right and left reversing the fourth image signal further comprises the steps of:

converting the fourth image signal into a digital image signal in synchronism with a scanning rate of the light receiving elements of the fourth solid state sensor;

storing the digital signal in a first line memory in a first order, the first order corresponding to consecutive light receiving elements in a first horizontal row of the light receiving elements;

reading out the digital signal stored in the first line memory in a second order, the second order being reversed from the first order;

storing the digital signal in a second line memory in the first order while the digital signal is being read out of the first line memory;

reading out the digital signal stored in the second line memory in the second order while the digital signal is being stored in the first line memory; and converting the digital signal read out of the first and second line memories to the fifth image signal.

10. The method according to claim 7, wherein the third and fourth image signals are each formed by a green image.

11. A solid state image pick-up apparatus comprising:

an objective lens for forming an image of an object to be picked-up;

a color separation optical system for separating the image of the object into red, green color and blue color images and further separating the green color image into first and second green color images to obtain four color images, the first of said first and second green color images being right and left reversed with respect to the remaining three color images;

a first solid state image sensor for receiving said first green color image to derive a first green image signal, the first solid state image sensor having light receiving elements arranged in a horizontal scanning direction;

a second solid state image sensor for receiving the second green color image to derive a second green image signal, the second solid state image sensor having light receiving elements arranged in the horizontal scanning direction, said light receiving elements of said second solid state image sensor being shifted with respect to light receiving elements of the first solid state image sensor in the horizontal scanning direction by a half of a pitch;

a right and left reversing means for deriving a right and left reversed image signal from the first solid state image sensor;

a combining circuit for combining the second green image signal and the right and left reversed image signal derived from the right and left reversing means at a ratio of 1:1 to derive a first color image signal;

a third solid state image sensor for receiving the red color image to derive a second color image signal;

a fourth solid state image sensor for receiving the blue color image to derive a third color image signal; and a luminance matrix for mixing said first, second and third color image signals at a predetermined ratio to derive a luminance signal.

12. An apparatus according to claim 11, wherein said right and left reversing means comprises an analog-to-digital converter for converting said one of said first or second image signals read out of said first and second solid state image sensors into a digital image signal, first and second switches which are driven in synchronism with a horizontal driving signal, first and second line memories which store said digital image signal, and a digital-to-analog converter for converting the digital image signal read out of said first and second line memories into an analog image signal, said first and second switches being driven such that the digital image signal is stored in said first and second line memories alternatively and is read out of said first and second line memories alternatively in a direction which is opposite to a direction in which the digital image signal is stored in said first and second line memories to derive a right and left reversed digital image signal.

* * * * *